though somewhat higher temperatures may be used, if desired, so long as the heat applied does not degrade the protein tissue of the fat substantially. In general, temperatures below the boiling point of water should be used. The purpose of the partial rendering is to produce an oil slurry of the protein tissue, that is, a slurry in which the rendered fat is the liquid vehicle. The protein tissue in this slurry is then reduced by mechanical disintegration to a pulp. This may be accomplished in a number of different ways, such as by an attrition mill, a comminutor of the Waring Blendor type, described in U. S. Patent No. 2,109,501, a Jordon Mill, which is used for the reduction of wood pulp in the manufacture of paper, etc.

United States Patent Office 2,697,112
Patented Dec. 14, 1954

2,697,112

RENDERING FAT

Albert J. Kramer, Arlington, Va.

No Drawing. Application January 20, 1951,
Serial No. 207,060

2 Claims. (Cl. 260—412.6)

This invention relates to fat reduction and is more particularly concerned with a novel method for rendering fat and to novel products obtainable therefrom.

One of the objects of this invention is to improve upon the Pavia process of fat rendering as described in U. S. Patent No. 2,516,071.

In the Pavia process, the resulting residue, referred to as cellular tissue, contains a considerable amount of unrendered fat, usually about 50% to 70%. This residue, while suitable as an edible product for admixture with other ingredients of various foods and feeds, would be even more useful and valuable if it contained less fat, that is, if it contained a higher ratio of protein to fat. In conventional packing plant operations, many of the mixed or specialty meat products are made from various parts of the animals which on the average contain a smaller proportion of fat than that present in the Pavia process residue. Consequently, in order to use the Pavia process residue, the other ingredients used must contain a correspondingly smaller amount of fat in order to make a suitable food product or products which will meet the requirements of the industry, including Government requirements.

Accordingly, another object of the invention is the provision of a method of rendering which will reduce sharply the fat content of the normal Pavia residue.

The Pavia process also requires comminution of the fat to a small particle size. In the range of about 1/8" to 1/16" are the particle sizes being used in commercial operations. With available commercial equipment, it is difficult to rapidly comminute fat to this particle size unless it is in a chilled or frozen condition. Moreover, it is difficult, if at all possible, to secure commercial equipment which can be used to grind or comminute the skins of animals to the particle size with the rapidity needed in the Pavia process.

Accordingly, further objects of the invention are the provision of a process of rapidly rendering fat which does not require chilling of the fat, which can be used to render the fat from skins and which does not require as fine a degree of comminution as the Pavia process.

These and other objects and advantages of this invention will be apparent from the following description.

In general the method of this invention comprises heating particles of raw fat to (1) liquefy the oil in the fat, (2) partially render the fat and (3) produce a slurry of the proteinaceous tissue of the fat in the rendered liquid oil. The proteinaceous tissue is then reduced to a pulp in the slurry. The liquid fat is then separated from the pulp.

The fat particles may be of any desired size depending upon the equipment available. It may be of the same particle size used in the Pavia process or of larger sizes. For example, ordinary meat grinders have difficulty in comminuting animal skins to particle sizes on the order of 1/8", that is, through a grinder plate having 1/8" holes. However, these skins can be ground through larger plates. Some types of skin may be passed through a 1/4" plate. Others may require a 1/2" or even a 1" plate. Such large plate openings, while they may not be wholly satisfactory for rendering under the Pavia process, are suitable for the present invention. Moreover, large plate openings of this kind render it unnecessary to chill or freeze the raw fat before grinding, thereby permitting killing fats to be rendered immediately after leaving the killing floor without holding them for prolonged periods in a chilling room. This has the advantage of saving time, space and labor in the preparation of the fats for rendering and, moreover, prevents the unnecessary development of undesirable free fatty acids in the raw fat before rendering.

The partial rendering of the fat may be accomplished at a very low temperature and need not be any higher than what is required under Government inspection to render the fat safe for human consumption. A temperature of about 140° to 160° F. is, therefore, suitable, al- The fat in the resulting pulp slurry is then separated from the pulp in any desired manner, such as straining or filtering, centrifuging, gravity separation, or any other desired method. The separation may, for example, be effected on a Fourdrinier screen to obtain the separated pulp in the form of a continuous rubber-like sheet.

The pulp residue is chiefly protein and is very cohesive. It has a number of uses, including admixture with other edible ingredients to produce various foods and feeds, such as sausages, bologna, scrapple and various animal feeds. It can also be used to add to soup mixes to impart flavor and nutritional values. It may be packaged separately and sold for general home cooking purposes for use in any case where an added protein is desired, such as hamburgers, meat loaves, croquettes, etc.

The pulp residue may also be used as a starting material in the manufacture of various artificial textiles, such as artificial wool, as a substitute for casein or other proteins. It may also be used in the manufacture of glue in conjunction with or as a substitute for the various keratin proteins and as a fibrous material for admixture with wood pulp in the manufacture of paper and other felted products either as such or after being hardened or tanned. Its use is indicated generally in any case where a protein base or protein starting material is desired, particularly if it is desired in a pulp form.

Having thus described my invention, I claim:

1. The process of rendering fat from cellular fatty tissue comprising comminuting the fatty tissue to a particle size on the order of about 1/4 of an inch to 1 inch, heating the comminuted fat to a temperature above about 140° F., but below the boiling point of water, to liquefy the fat in the comminuted tissues, then mechanically pulping the hot comminuted tissue to a non-cellular, fibrous state and immediately separating it from the liquid fat.

2. The process as defined by claim 1 in which the separation of the liquid fat from the pulped tissue is effected on a Fourdrinier screen.

References Cited in the file of this patent

UNITED STATES PATENTS

| Number | Name | Date |
|---|---|---|
| 137,698 | Marchall | Apr. 8, 1873 |
| 705,034 | Cameron | July 22, 1902 |
| 2,467,529 | Hormel | Apr. 19, 1949 |
| 2,468,636 | Napier | Apr. 26, 1949 |
| 2,516,071 | Pavia | July 18, 1950 |